United States Patent [19]
Benson et al.

[11] 3,812,709
[45] May 28, 1974

[54] STRESS GAGE
[75] Inventors: Robert W. Benson; James Ronald Chapman, both of Nashville, Tenn.
[73] Assignee: Thermo Electron Corporation, Waltham, Mass.
[22] Filed: Feb. 9, 1972
[21] Appl. No.: 224,794

[52] U.S. Cl. ............ 73/67.5 R, 73/67.8 R, 73/88 R
[51] Int. Cl. .......................................... G01n 29/04
[58] Field of Search ............... 73/67.5 R, 67.9, 88 R

[56] References Cited
OTHER PUBLICATIONS

R. T. Smith, "Stress–Induced Anisotropy in Solids the Acousto–Elastic Effect", Ultrasonics, July–Sept. 1963, p. 135–147.
Sound–Velocity R. Asay et al., "Ultrasonic Technique for Determining Sound-Velocity Changes in High-Loss Materials", J.A.S.A., Mar. 1969, p. 566–571.
J. E. Hill et al., "Velocity of Sound Measurements in Liquid Metals", The Review of Scientific Instruments, Oct. 1965, p. 1465–1472.

*Primary Examiner*—Richard C. Queisser
*Assistant Examiner*—John P. Beauchamp
*Attorney, Agent, or Firm*—Alfred H. Rosen; Frank A. Steinhilper

[57] ABSTRACT

This application discloses a system for non-destructive measurement of stress in metallic specimens by use of elastic wave energy, preferably shear or surface waves in the ultrasonic frequency range. More particularly, there is described a measuring technique using either type of wave according to which the relative transit times for the ultrasonic waves over a fixed path length and along two principal axes of stress are determined with a precision equal substantially to one nanosecond. A self-contained stress gage instrument for practising the procedure is disclosed.

11 Claims, 6 Drawing Figures

STRESS GAGE

THE PRIOR ART

Prior techniques using strain gages or x-rays allow for an examination of the surface of a material with respect to changes in state caused by the application of forces. If the material under examination is kept within the elastic limit, it is then possible to compute the stress assuming a constant relationship between stress and strain. Such prior techniques, and their limitations, are discussed in U.S. Pat. No. 3,101,608 of the present inventor and another, which teaches a method of measuring stress in a solid material which involves the steps of propagating through a specimen of the material polarized elastic shear-wave energy and measuring the angular rotation of polarization of the wave as a function of applied stress. Exploratory work demonstrated that the change of shear wave velocity was proportional to applied stress even beyond the elastic limit of certain materials and later work demonstrated the same to be true of the velocity of ultrasonic surface waves.

Further development of non-destructive methods for determining residual stress and fatigue damage in metals, which was done by and under direction of the present inventor under Contract No. NAS8-20208 with George C. Marshall Space Flight Center, Huntsville, Ala., is reported in the Final Report prepared Mar. 8, 1968, under that contract, available under Accession Number N68-21875 from the Clearing House for Federal Scientific and Technical Information, U.S. Department of Commerce (hereinafter the "NASA Report"). In the NASA Report methods of measuring stress within various alloys of aluminum, in terms of changes in ultrasonic velocity of both shear and surface waves, and certain instrumentation for using those methods, are described. A procedure for determining the respective orientations of major axes of stress is described, together with certain systems for making time-of-flight and frequency-null measurements.

The instrumentation and techniques described in the NASA Report are employed in a direct measurement of stress and are not restricted to the elastic behavior of materials. Thus, a sample of metal stock as received from a mill can be measured ultrasonically to determine the initial state of stress due to rolling and forming procedures, which is important because the formation of a metal piece, first as an ingot and then by successive rolling or extruding process, introduces residual stresses deriving from the fact that the piece is thereby obviously stressed beyond its elastic limit. The instrumentation features an electronic oscillator for energizing the sender of a sender-receiver transducer assembly which defines the physical path length of elastic wave propagation. The transducer assembly is shown, for example, in the NASA Report at FIG. 8 for shear waves and at FIGS. 14 and 16 for surface waves. In either case, the wave employed is a transverse wave, in which the particle motion is transverse to the direction of wave propagation. The shear waves are polarized, and the measurement of internal stresses is dependent on the use of these waves. The surface waves are characterized by particle motion which is essentially perpendicular to the surface. In either case two or more major or principal axes of stress are determined, and it is sought to measure, with a high degree of precision, the relative transit times over the same path length but along two different principal axes of stress of waves of one of said types. The present invention is essentially an improvement in the measuring of such transit times.

GENERAL NATURE OF THE INVENTION

In accordance with the present invention, an improved instrument is provided for determining within approximately 1 nanosecond the relative transit times for propagation of elastic wave energy in a specimen of a metal over similar path lengths of propagation along two principal axes of stress. The instrument features an electronic oscillator that runs at a prescribed frequency in combination with gating means to set the oscillator into oscillation sequentially, in the same polarity-going direction for a first time interval and then for a second shorter time interval. The first output of the oscillator is applied to the sender transducer. The second output of the oscillator and the signal generated in the receiver transducer by wave energy propagated from the sender transducer are both applied to a comparator, wherein the second output of the oscillator is a reference signal. Variable calibrated time delay means, applied to the gating means for the second time interval enables one to adjust the signals in the comparator for a coincidence and the time-of-flight is indicated by the calibrated time delay means.

Use of a single oscillator at fixed frequency with gating arranged to initiate each burst of oscillation in the same polarity-going direction enables precision of time measurement on the order of one nanosecond. The oscillator is not a continuously running oscillator. It is started and stopped by suitable gating pulses. Preferably, the oscillator is gated by a triggered monostable vibrator; at the time the gating pulses are impressed, the oscillator is allowed to oscillate by first changing the state of the multivibrator so that the oscillator starts with the same phase and oscillates at the same frequency independent of whether the output is used to drive the sender transducer or as a reference signal. By using the same oscillator for both driving the sender transducer and providing the reference signal the identical frequency is produced.

By use of the system of the present invention, it is possible to have both time and frequency as independent variables, which allows for a more thorough definition of residual stress.

DESCRIPTION OF AN EMBODIMENT

The following description of an embodiment of the invention refers to the accompanying drawings wherein.

Figure 1:
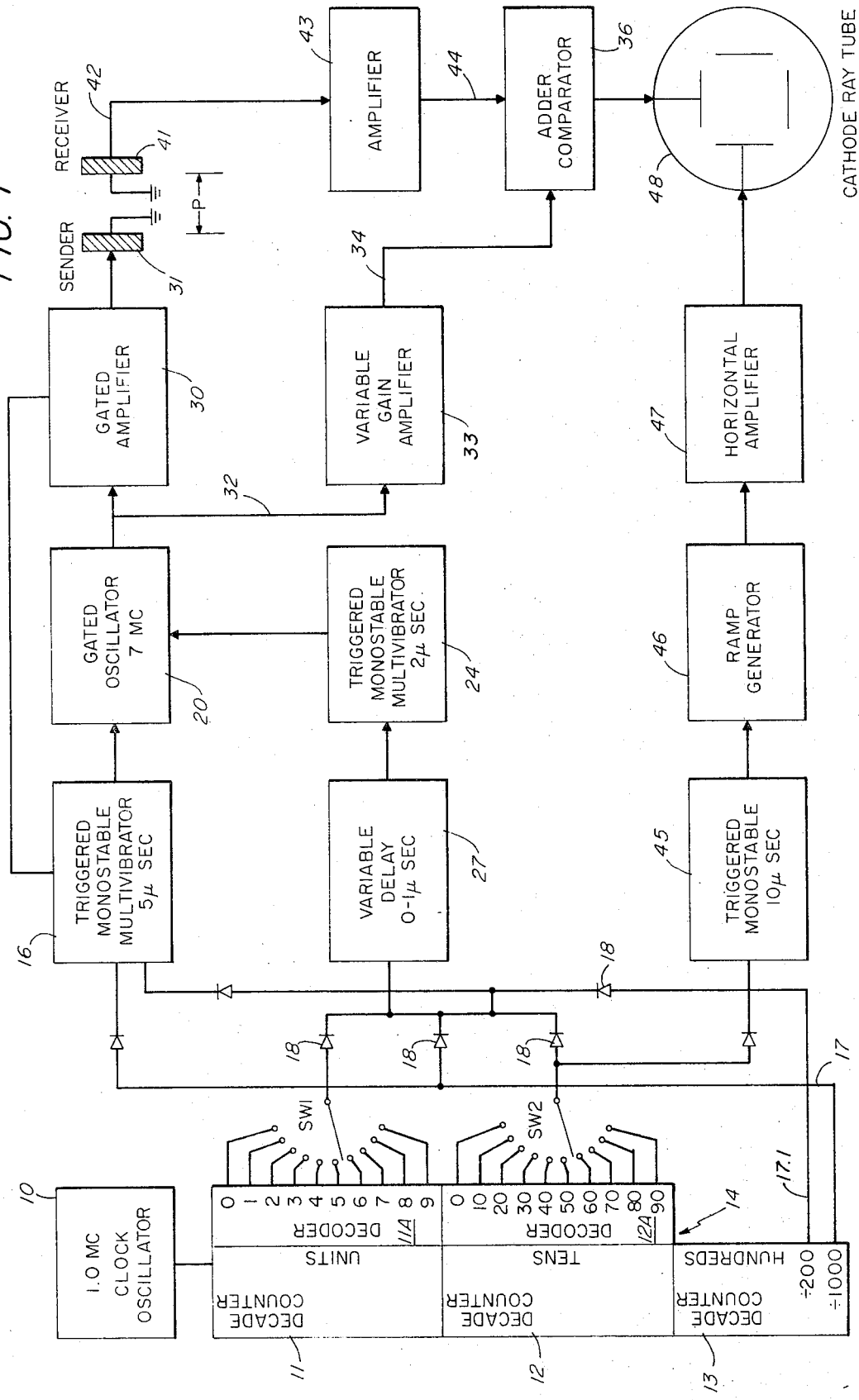
FIG. 1 is a block diagram of an instrument according to the invention.

A simplified block diagram of the instrument is shown in FIG. 1. All of the cathode ray tube circuits have been omitted for simplification. The entire system is controlled by a 1.0 megahertz clock oscillator, here in the form of a crystal controlled multivibrator 10, which provides timing pulses for each microsecond. The output of the crystal-controlled multivibrator circuit is fed through three decade scalers 11 12, 13 and their associated decade decoders 11A and 12A, comprising a counting section 14. The counting section 14 repeats itself each 1,000 microseconds, producing an output pulse 15, shown in FIG. 2, occurring once each millisecond over line 17.

Each decade scaler includes a counter, the first scaler 11 counting up to 9 and having a decoder section 11A which has a digital selector switch SW–1 including taps 0, 1, 2, 3, . . . 9, for output of the counted pulse indicated adjacent the selected tap. The second scaler 12 includes a counter for counting in groups of ten timing pulses and has a decoder section 12A which has a second digital selector switch SW–2 including taps 0, 10, 20, 30, . . . 90 for output of the counted pulse indicated adjacent the selected tap. The third scaler 13 has simply a decade counter which provides at its output 17 the output pulse 15 occurring once each millisecond. The taps on the decoders 11A and 12A provide a pulse signal via "and" gate diodes 18 to the variable delay 27 which is adjustable by selector switches SW–1 and SW–2 in microsecond units relative to the master oscillator 10 output, over a span of 100 microseconds following the once-per-millisecond pulse 15. The variable delay 27 then introduces a further incremental delay between 0 and 1 microsecond in increments on the order of 1 nanosecond.

Each millisecond, the counter 14 provides a trigger pulse 15 to a first triggered monostable multivibrator 16. The duration of the output pulse from this monostable multivibrator (in the present example 5 μsec) defines the time duration of the ultrasonic search pulse of the instrument, which is determined in turn by a pulse width switch (not shown) in the instrument. The output of the monostable multivibrator 16 allows a gated oscillator 20 to switch on, producing the drive voltage for the actual ultrasonic frequency pulse for test. The oscillator is always started with a positive going pulse independent of the actual time of start. A train of positive-going pulses of ultrasonic waves is therefore produced, precisely 1 millisecond apart as determined by the 1 megahertz master oscillator 10 and the clock section 14.

The output of the gated oscillator 20 is fed to one or more amplifier stages 30 suitable for driving the ultrasonic sender crystal 31. The amplifier 30 is allowed to amplify only when the first triggered monostable multivibrator 16 is producing the gate pulse for the oscillator 20. A second monostable multivibrator 24 which also gates on the oscillator 20 does not allow the amplifier 30 to produce additional output, as will appear below.

The output of the decade scalers 11, 12 is fed to the variable delay 27 by the use of the digital selector switches SW–1 and SW–2 and diode "and" gates 18 to produce a reference signal. The digital selector switches allow the reference pulse to be produced at any selected microsecond interval from 0 to 100 microseconds after the sender 31 has been energized and the ultrasonic pulse launched into the test specimen. The variable delay circuit 27 includes a ramp-voltage generator whose output is compared to a reference voltage determined by 10-turn precision potentiometer (see FIG. 6) of well-known form. When the ramp voltage is equal to the reference voltage, a pulse (92, in FIG. 6) is generated which triggers the second monostable multivibrator 24. The 10-turn potentiometer is calibrated so that each division is equal to one nanosecond, and this provides a Vernier time delay. The triggered monostable multivibrator 24 produces a pulse, approximately 2 microseconds in duration, which also gates the same oscillator 20 as is used to drive the sender transducer 31.

The output of the gated oscillator 20 is therefore the drive signal for the ultrasonic signal pulse followed by a pulse 25 (FIG. 2C) of the same frequency, but delayed by a selected number of microseconds (The Digital Switches) and a selected number of nanoseconds (The Vernier Time Delay). Both gated oscillator frequency output pulses or bursts start with a positive going wave to provide an accurate repeatable time relationship. Both signals are fed through a variable gain amplifier 33, to an adder comparator circuit 36 over a line 34. The received signal from the receiving transducer 41 is amplified and also fed to the adder comparator circuit over a line 44. The phase relationship between the oscillator-derived signals received in the adder-comparator 36 over lines 34 and 44 is a function only of the gage length P of the transducers 31, 41 and of the speed of travel of the elastic wave through the test material.

If the second or reference pulse 25 is delayed by the transit time of the ultrasonic signal in the specimen over path P, then the two pulses, there is he received signal via line 44 and the reference pulse via line 34, will add to each other. The vernier delay time control 27 may be adjusted to place the two signals in phase opposition with each other. The further adjustment of the reference pulse amplitude in amplifier 33 will allow for a null to occur during the period when both signals are present. The resultant adjustment as observed on the cathode ray tube 48 is shown in FIG. 3B. It is possible to obtain a null for delay times separated by the period of the ultrasonic wave. For a 7 megahertz wave, the nulls will occur every 143 nanoseconds.

Figure 2:
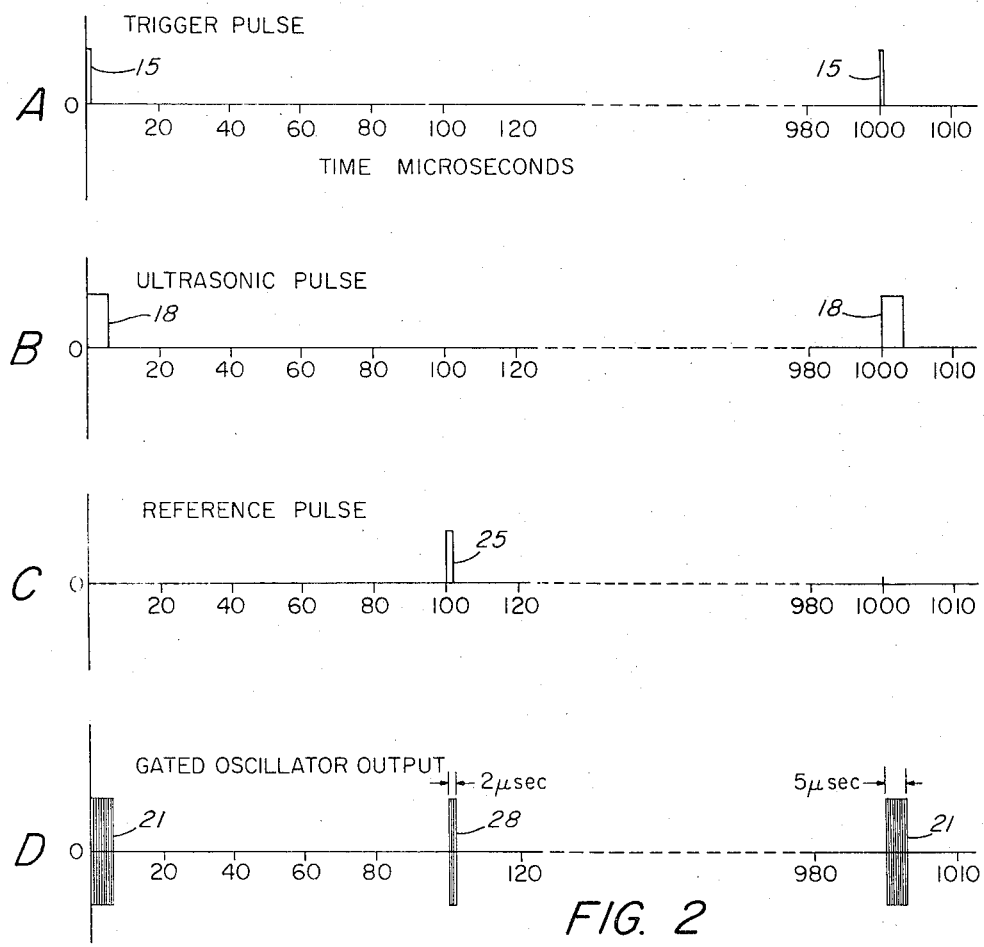
FIG. 2 is a set of graphs illustrating waveforms produced and used in the instrument.

Graph A of FIG. 2 represents a trigger pulse 15 which precisely starts the 5 μsec triggered monostable multivibrator 16 every 1,00 microseconds. In this way the triggered monostable multivibrator 16 controls the system to generate a measurement every millisecond. Actually, as will presently appear, the time span required for measurement of stress is only slightly greater than 100 microseconds, so that 90 percent of each inter-pulse interval is silent. This silent period is used to allow the attenuation of spurious waves and reflections generated in the test material by the measuring pulse. The silent period could be shorter, if desired. A second tap 17.1 on the third decade scaler indicates that this interval could be shorter; e.g: 200 microseconds.

The output of the monostable multivibrator 16 is a 5 μsec long pulse 18 shown in graph B on FIG. 2. This multivibrator has the characteristic of performing its assigned operation upon being triggered, but does not repeat unless triggered again; i.e., it is "monostable." The pulse 18 is applied to open, or start, the gated oscillator 20, which then oscillates at 7 MHz for 5 μsec every millisecond. The resulting burst of the 7 MHz signal is shown at 21 on the graph D in FIG. 2. The second triggered monostable multivibrator 24 is used to generate a 2 μsec reference pulse 25 shown on graph C. The control of this time delay is accomplished as described above, to an accuracy of 1 nonosecond. This 2 μsec pulse is applied to the gated oscillator 20 to open or start it oscillating, for 2 μsec every millisecond. The last graph D in FIG. 2 shows the resultant oscillator output, which is a burst 28 of the 7 MHz signal 2 μsec long.

The 5 μsec burst 21 of gated oscillator output is provided through the gated amplifier 30 to the sender transducer 31. This pulse contains 35 cycles of the 7 MHz oscillator signal. The amplifier is controlled by the 5 μsec triggered monostable multivibrator 16 such that only this burst of oscillator output can get to the sender transducer. The 2 μsec monostable multivibrator 24 then gates the second oscillator burst 28 which follows at an interval adjustable from 0 to 100 μsec behind the 5 sec burst 21. The 5 μsec burst 21 passes from the sender transducer 31 to the test material (not shown) and after propagating over a path P is received by the receiver transducer 41 which generates a corresponding 7 MHz burst and delivers it over line 42 via an amplifier 43 and line 44 to the adder-comparator 36.

Figure 3:
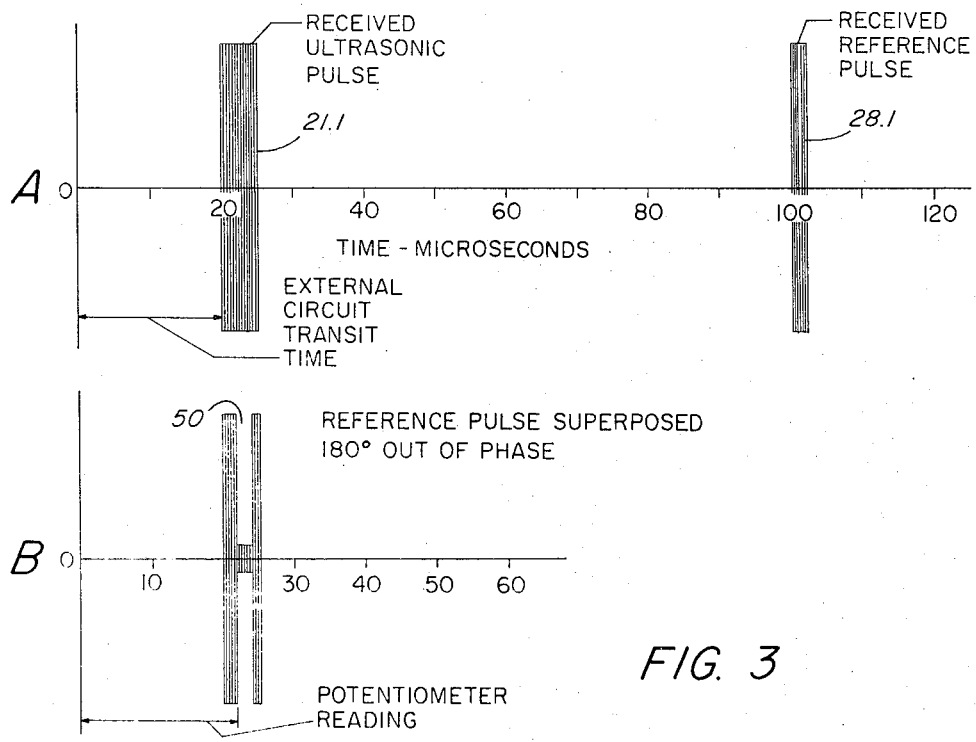
FIG. 3 is a set of graphs illustrating a mode of using the instrument.

FIG. 3 illustrates what happens in the adder comparator 36. The received signal over path P will shown the 5 μsec pulse or burst of 7 MHz oscillations 21.1 delayed by the transit time through the transducers 31 and 41 and test material (not shown). This will be of the order of 20 μseconds. The received reference pulse 28.1 will be located in time as it was sent. These are shown in the first graph A. By adjusting the position of the reference pulse 28.1, in time, with respect to the test pulse 21.1. the two can be superposed in the cathode ray tube 48. If the position of one relative to the other is adjusted in time such that they are out of phase a null 50 will appear as is shown in graph B. Theoretically, the null should be adjustable to zero amplitude by adjusting the gain of the reference pulse amplifier 33.

The illustration shown at FIG. 3B is presented visually in the cathode ray tube 48, which receives on its vertical plates the output of the adder comparator 36, and on its horizontal plates an appropriate sweep voltage via a 10 μsec triggered monostable multivibrator 45 coupled to the tens decade counter 12, a ramp generater 46 and an amplifier 47.

The cathode ray display is thus also controlled by the crystal controlled clock 10, 14. It is possible to observe multiple reflections of the ultrasonic wave in a specimen by the use of a long sweep time triggered at the time of initiation of the ultrasonic signal. With the long sweep time, the reference pulse delay is adjusted so that the reference pulse occurs at the time of the first received pulse.

The variable delay 27 comprises an adjustment potentiometer (see FIG. 6) for the reference pulse 28, which is calibrated to read in nanoseconds. Thus, the reading indicated by the calibrations will correspond to the beginning of the null as set by the variable delay. However the actual transit time through the external acoustical circuit (path P) will be measured to the beginning of the received 5 μsec pulse. The period of the 7 MHz wave is 143 nanoseconds; thus, a null can be achieved every 143 nanoseconds (i.e., 35 times) within the dimensions of the received ultrasonic pulse (5,000 nanoseconds). Clearly then, the instrument does not necessarily read the transit time through the external circuit; furthermore, since each transducer 31, 41 has a significant transit time, the instrument does not read absolutely the transit time through the test material (i.e., over path P) even if the reference 28.1 and ultrasonic 21.1 pulses are perfectly lined up on the first cycle of the ultrasonic received pulse. Nevertheless, this is unimportant. Obviously, a reading taken without a load on the sample can be followed by a reading taken with a load on the sample without changing the setting of the calibrated vernier potentiometer in delay 27; or the load can be changed from one reading to the next. Since the effect of changing load stress on the time delay is only a few nanoseconds, and, as is known the propagation velocity of elastic waves in metal changes linearly with respect to applied stress, adjusting the variable delay to the nearest null point after changing the load on the sample will achieve the second measurement in the same cycle as the first and give an accurate reading of the change in the transit time. If there was no change in the path length or temperature, this change in time delay should correspond to the change in stress.

The input wave frequency selected in the foregoing exemplary embodiment of the stress gage is nominally 7 MHz. Thus, for surface measurement the wave length of the surface wave traveling in aluminum is about 0.016 inches, which is also the depth of penetration. The wave period is 143 nanoseconds, compared with expected time-of-flight measurements of 10–20 naonoseconds. Thus, the electronic technique to measure transit times must have a very precise nulling scheme to avoid catastrophic errors, and the present invention provides such precision. In this respect, high frequencies would appear to improve precision; however, they also narrow the thickness of the surface wave which increases the criticality of matching the transducers 31, 41 to the specific metal under examination. Lowering the frequency increases the wave width. At 1 MHz, the penetration would be 0.112 inches. Since the technique measures the mean stress through which the acoustic wave passes, varying the frequency presents a means of measuring stress gradients into the surface. Thus the present invention envisions that the frequency of the gated oscillator 20 may be varied for measurement of additional parameters.

Figure 4:
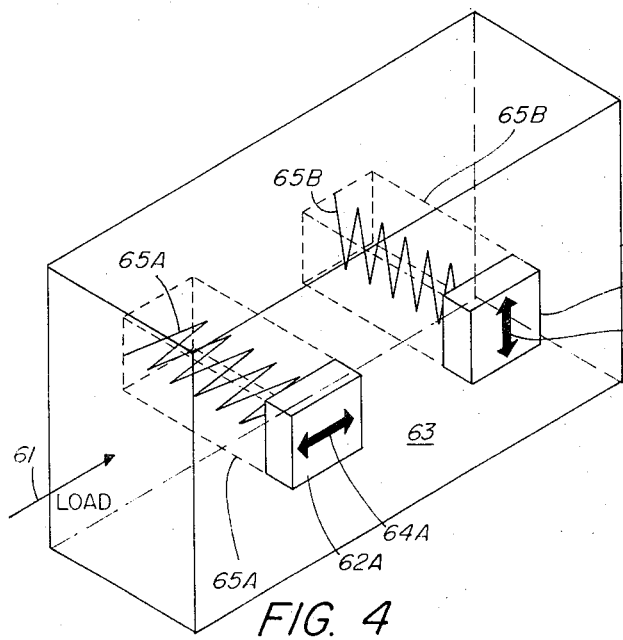
FIG. 4 is a schematic illustration of modes of execution of transverse wave propagation in a specimen.

FIG. 4 illustrates generally the nature of shear (transverse) wave propagation in a specimen of metal represented by a block 60 stressed by a load applied in the direction of the arrow 61. A Y-cut quartz crystal transducer 62A or 62B can be affixed to a side 63 of the block, with its mode of excitation, indicated by a double-headed arrow 64A or 64B, oriented parallel to the arrow 61 as at 64A or transverse to the arrow 61 as at 64B, in either case propagating transverse waves 65A or 65B into the specimen 60 in a direction transverse or perpendicular to the arrow 61. Dashed lines 66A and 66B represent the beam envelope in each case.

Figure 5:
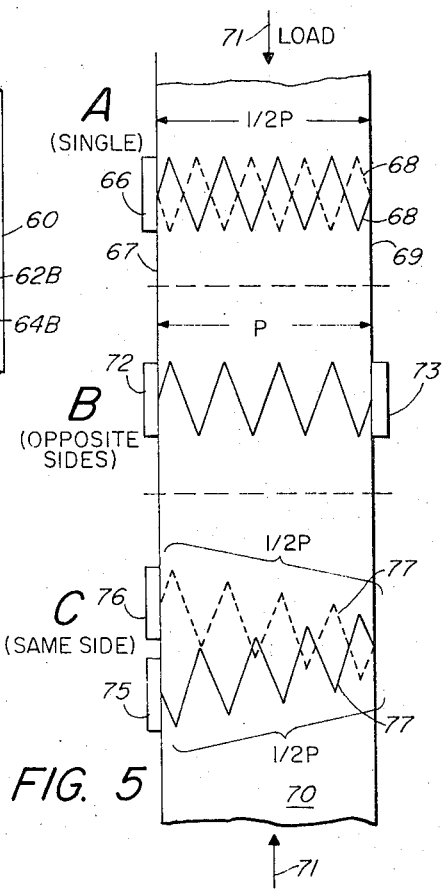
FIG. 5 is a schematic illustration of several modes to launch and retrieve transverse waves into and from a specimen for bulk stress measurements.

FIG. 5 illustrates several modes of using one or a pair of transducers to establish the path (gage) length P for bulk stress measurements using shear waves. At FIG. 5A, a single transducer 66 launches and receives the waves from and at one side 67 of the specimen 70, the waves 68 being incident upon and reflected from the opposite side 69. The distance between the two sides 67, 69 is ½ P, and again as in all examples in FIG. 5, the direction of acoustic wave propagation is transverse to the direction 71 of applied load force. In this instance, a single transducer is used and means, well-known, may be used to block the incident ultrasonic pulse signal 21 from appearing in the cathode ray tube 48, if desired.

At FIG. 5B one may see a simpler arrangement using two transducers 72, 73 at opposite sides 67, 69 respectively, of the specimen, and in this instance the gage length P is the distance between the two sides 67 and 69. This arrangement is generally known from the aforementioned U.S. Pat. No. 3,101,608.

At FIG. 5C two transducers 75, 76 are located on the same side 67 of the specimen 70, for respectively launching and retrieving shear waves 77 by reflection from the opposite side 69. In this instance the gage length P is slightly greater than twice the distance between the two sides 67, 69.

When surface waves are used, the gage length P may be the distance between the two transducers 31, 41 in a single assembly as is shown at FIG. 16 in the NASA Report.

Figure 6:
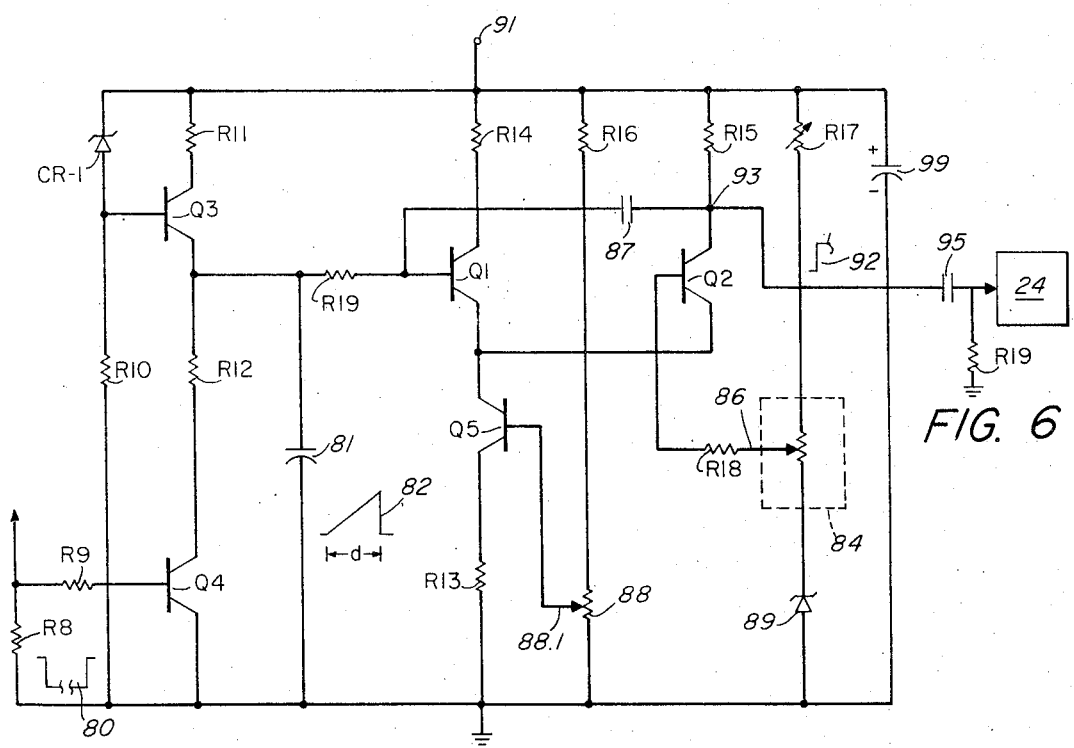
FIG. 6 is a circuit diagram of a portion of one of the blocks in FIG. 1.

FIG. 6 illustrates a portion of the variable delay 27 which produces the vernier delay increment in the nanosecond range.

A current transistor 3 has its emitter-collector path connected in series with a resistor R12 and the emitter-collector path of a control transistor Q4 across the voltage supply, between ground and the positive (+) terminal 91. A charging capacitor 81 is connected in shunt with the resistor R12 and control transistor Q4. A zener diode CR-1 and resistor R10 in series across the supply, tapered at their junction to Q3 base, proivde base bias voltage to maintain the current transistor Q3 conducting through either Q4 or capacitor 81. Preceding circuitry (not shown) provides current in a bias resistor R8 generating a voltage drop which is applied via a coupling resistor R9 to Q4 base maintaining Q4 normally conducting. Responsive to a clock pulse derived through decoders 11A and 12A via the decimal switches SW-1 and SW-2 the preceding circuitry cuts off current through the bias resistor R8 for about 10 microseconds, thereby effectively grounding Q4 base. This is illustrated in FIG. 6 as a negative-going rectangular voltage pulse 80. While Q4 base is grounded, Q3 current passes to charging capacitor 81. The charging current causes the voltage across this capacitor to increase with time, providing a ramp-function voltage illustrated at 82, the duration "d" *of which is greater than* 1 microsecond. The side of capacitor 81 connected to Q3 collector goes in the positive direction applying an increasingly positive voltage to the base of transistor Q1. Upon termination of the negative-going pulse 80, Q4 becomes conductive, discharging the capacitor 81 via resistor R12.

Transistors Q1 and Q2 are connected as a long-tailed pair, with their emitters connected together through switch transistor Q5 having its emitter-collector path in series with resistor R13 to ground. The collectors of Q1 and Q2 are connected via equalvalued resistors R14, R15, respectively, to the voltage "+" terminal 91. A first voltage divider comprising a resistor R16 and a potentiometer 88 in series is connected across the voltage supply. The tap 88.1 of the potentiometer 88 is connected to Q5 base. The vernier potentiometer 84 is connected in a second voltage divider circuit in series with a variable resistor R17 and a zener diode 89 across the power supply. The calibrated tap 86 of the vernier potentiometer is connected to Q2 base via a resistor R18. A regenerative feedback capacitor 87 is coupled between Q1 base and Q2 collector, to which is also connected the output coupling capacitor 95 for the reference-pulse-triggered monostable multivibrator 24. Q2 collector is thus the output terminal 93 for the variable delay 27.

The setting of the calibrated tap 86 on the vernier potentiometer 84 establishes a particular voltage on Q2 base relative to ground, the minimum value of which is the voltage-drop across the zener diode 89. The tap 88.1 of the potentiometer 88 in the first voltage divider is set so that Q2 and Q5 will conduct with that minimum voltage on Q2 base. Transistor Q5 maintains constant the sum of currents through Q1 and Q2. Q2 emitter will follow Q2 base in voltage within about ½ volt, and Q1 emitter being tied to Q2 emitter will do the same, with the result that, at the begining of generating a ramp voltage wave 82, Q1 base voltage is low compared to Q1 emitter, and all of the current through Q5 is supplied by Q2. The setting of the calibrated vernier potentiometer tap 86 determines the voltage level of Q1 and Q2 emitters relative to ground.

The ramp voltage 82 is coupled to Q1 base over a resistor R19. Transistor Q1 will be non-conductive while the ramp voltage 82 is at zero volts or at values below the Q1 and Q2 emitter voltage. Thus, with Q1 non-conductive and Q2 conducting, the ouput terminal 93 at Q2 collector is at a voltage below supply positive at terminal 91 determined by the voltage drop in its collector resistor R15, compared to the drop in the common emitter resistor R13 and series drop in the emitter-collector paths of Q2 and Q5.

As the ramp voltage increases Q1 base will get to the point where Q1 wants to draw current. This point depends on the setting of the calibrated tap 86 on the vernier potentiometer 84. As soon as Q1 wants to draw current the current through Q2 will start to decrease and the voltage at the output terminal 93, namely Q2 collector, will start to rise. Owing to the regenerative coupling between Q2 collector and Q1 base via the regenerative feedback capacitor 87, Q1 base is driven in the positive direction, and Q1 is turned on very rapidly, with the result that a fast switching action occurs as soon as Q1 wants to draw current, and all of the current through Q5 now comes through Q1. Current through Q2 collector resistor R15 is terminated, raising the voltage at the output terminal 93 to essentially the positive voltage at the supply terminal 91, thereby to initiate an output pulse 92. The leading edge of the output pulse is fed via a differentiating capacitor 95 and resistor R19 to the triggered monostable multivibrator 24. The differentiator arrangement C95-R19 assures that the leading edge of the output pulse 92 will be used to trigger the multivibrator 24. The trailing edge of the output pulse is not used. The circuit is re-set when the ramp-voltage capacitor 81 is discharged through resistor R12 and transistor Q4 upon termination of the negative-going switch pulse 80.

A set of practical values and identifications for the components in FIG. 6, which has been used in practice, is as follows:

Q1 = 2N4123
Q2 = 2N4123
Q3 = 2N3905
Q4 = 2N3904
Q5 = 2N4123

CR1 = 1N728
Diode 89 = 1N728
Potentiometer 84 = 10-turn Potentiometer; 5 Kilohm resistor; calibrated in Nano-Sec. Delay
C-81 = 0.001 $\mu$f
C-87 = 50 pf
C-95 = 50 pf
R-8 = 100 ohms
R-9 = 4.7 kilohms
R-10 = 15 kilohms
R11 = 220 ohms
R12 = 100 ohms
R13 = 100 ohms
R14 = 560 ohms
R15 = 560 ohms
R16 = 15 kilohms
R17 = 5 kilohms max. (variable)
R18 = 2.2 kilohms
R19 = 1.5 kilohms
Potentiometer 88 = 25 kilohms
C-99 = Electrolytic; 20 $\mu$f at 25 volts
Voltage at 91 = +15 volts above ground.

The circuit of FIG. 6 is exemplary only. Being taken from the drawings of a practical instrument embodying the invention, it is described herein as the best mode now known to practice the invention. The invention is not limited to it, being measured rather by the appended claims.

We claim:

1. In an electro-acoustic instrument for measuring stress in a specimen of metal by propagating elastic waves in the specimen and determining the relative transit times for such waves over similar path lengths of propagation along two principal axes of stress, the improvement comprising: an electronic oscillator arranged to run at a prescribed frequency, first means to gate said oscillator into oscillation to emit a first train of oscillations at said frequency enduring for a first period between a few and several microseconds long, electromechanical transducer means for applying elastic wave energy to said specimen and means to apply said train to said transducer means for initiating transit of said specimen by a corresponding train of elastic waves, electromechanical transducer means for receiving said train of elastic waves at completion of said transit and providing in response thereto a train of received electrical oscillations enduring for a time equal substantially to said first period, second means to gate said oscillator into oscillation to emit a second train of oscillations at said frequency for a second period shorter than said first period, each of said first and second gating means being arranged to gate said oscillator into oscillation in the same polarity-going direction, adjustable time delay means coupled between said first and second gating means for adjusting said second period in time with reference to said first period with a precision equal substantially to one nanosecond, and signal comparator means arranged to receive said received electrical oscillations and said second train of oscillations for comparison when simultaneously present therein, said time delay means being operable to present said second train of oscillations to said comparator means in a time interval that is adjustable within the time period when said received electrical oscillations are present therein.

2. An instrument according to claim 1 in which each of said first and second gating means includes respectively a first and a second triggerable monostable multivibrator each of which upon being triggered with a trigger voltage provides a single gating pulse of the same polarity, said gating pulses having time durations equal, respectively to said first and second periods.

3. An instrument according to claim 1 having a common source of trigger voltage connected directly to said first gating means and through said time delay means to said second gating means.

4. An instrument according to claim 1 in which said means to apply said first train of oscillations to said transducer means is a gated device which requires to be gated to an operative state, and a connection is provided between said first gating means and said gated device to render operative said applying means for at least the duration of said first period.

5. An instrument according to claim 4 in which a separate connection between said oscillator and said signal comparator means provides said second train of oscillations to said signal comparator means.

6. An instrument according to claim 2 in which said means to apply said first train of oscillations to said transducer means is a gated device which requires to be gated to an operative state, and a connection is provided between said first multivibrator to provide the gating pulse thereof to said gated device to render operative said applying means for the duration of said first period.

7. An instrument according to claim 1 in which said time delay means is operable to adjust said time interval with a precision such that said second train of oscillations is in phase opposition to said received electrical oscillations in said comparator.

8. An instrument according to claim 1 including means to alter said prescribed frequency for making a measurement on a given specimen of metal first at one prescribed frequency and thereafter at another, to determine a stress parameter as a function of change in said frequency.

9. An instrument according to claim 1 in which said transducer means comprise a first electromechanical transducer for location at a first position on said specimen, for initiating said transit, and a second separate electromechanical transducer for location at a second location on said specimen, for receiving said train of elastic waves.

10. An instrument according to claim 1 in which said transducer means comprise a single electromechanical transducer to initiate and receive said waves.

11. In an electro-acoustic process of measuring stress in a specimen of metal by propagating elastic waves in the specimen and determining the relative transit times for such waves over similar path lengths of propagation along two principal axes of stress, the improvement comprising the steps of launching transverse elastic waves into the specimen responsive to a first burst of electrical oscillations at a prescribed frequency starting in a given polarity-going direction and enduring for a first time interval, generating a reference burst of electrical oscillations of the same frequency starting in the same polarity-going direction and enduring for a second time interval shorter than the first interval; providing an adjustable time delay on the order of tens of microseconds to a precision of approximately 1 nanosecond between said first and second bursts, receiving said elastic waves after transit over said path length and generating therefrom an electrical oscillation corresponding to said first burst, and adjusting said time delay to bring said reference burst into time-coincidence with said received-wave generated burst within the time interval of a single cycle of said frequency.

* * * * *

PO-1050
(5/69)

UNITED STATES PATENT OFFICE
CERTIFICATE OF CORRECTION

Patent No. 3,812,709    Dated May 28, 1974

Inventor(s) R.W. Benson; J.R. Chapman

It is certified that error appears in the above-identified patent and that said Letters Patent are hereby corrected as shown below:

Column 3, line 6, after "11" insert --,--
        line 15, delete "pulse" and insert --pulses--
Column 4, line 32, delete "there" and insert --that--
        delete "he" and insert --the--
        line 46, delete "1,00" and insert --1000--
Column 5, line 3, delete "nonosecond" and insert --nanosecond--
        line 26, delete "shown" and insert --show--
        line 34, delete ">" and insert --,-
Column 6, line 15, delete "metal" and insert --metals--
Column 7, line 25, delete "3" and insert --Θ3--
        line 32, delete "tapered" and insert --tapped--

Signed and sealed this 15th day of July 1975.

(SEAL)
Attest:

RUTH C. MASON
Attesting Officer

C. MARSHALL DANN
Commissioner of Patents
and Trademarks